Patented Aug. 20, 1935

2,011,594

UNITED STATES PATENT OFFICE 2,011,594

STABILIZING MATERIAL

William Seltzer, Passaic, N. J., assignor to Kraft-Phenix Cheese Corporation, Chicago, Ill., a corporation of Delaware No Drawing. Application November 14, 1932,
Serial No. 642,602

14 Claims. (Cl. 252—1)

In the manufacture of emulsified products, various agents have been used. These agents include a large range of substances having widely varying properties, many being hydrophilic colloidal substances which may be broadly classified as gums. Among the most widely-used of such substances are gelatine, tragacanth, and other gums of vegetable origin.

Irish and Iceland moss have been suggested for use as substitutes for gelatine, but the use of such materials has never been successful in food products, principally because of the characteristic fishy odor and unpleasant flavor which have been invariably attached to these substances and have been considered inseparable therefrom.

I have discovered methods of treating Irish moss and like marine vegetable matter which efficiently, economically and satisfactorily removes much of the odor, taste, color, and other impurities, as well as increasing the jell-strength thereof. The specific description will refer to Irish moss, with the understanding that the same applies generally to analogous materials, such as agar, kelp, the algins, alginates, etc.

Example I

To a mixture of 150 cc. 95% ethyl alcohol and 50 cc. water, I add 75 grams of commercial Irish moss powder, and obtain enough solvent action of the water with only a slight swelling of the moss particles. Filtration is accomplished easily but I prefer to use a basket-type centrifuge, washing the powder with 95% alcohol and drying.

The yield by this treatment is about 88%.

In Example I, above, the removal of impurities causing odor, taste, etc. seems to be accomplished chiefly by the water content of the purging agent. In an endeavor to increase the extractive power of water and thus result in a more refined Irish moss powder, I have found that by using other alcohols, an improved product resulted. Thus:

Example II

To a mixture of 220 pounds 91% of isopropyl alcohol and 58 pounds water is added 125 pounds commercial Irish moss powder. Soak two to four hours (there is no need to agitate except at first), filter (or centrifuge), wash with 215 pounds 91% isopropyl alcohol, and dry. The yield by this treatment is 80%.

Observation of batch processing and further trials indicated that the use of a purging agent containing even more water than in the above mixtures would result in a product containing even less of the undesirable matter ordinarily present in commercial Irish moss powder. The difficulty would be the increased swelling of the fine moss particles which would interfere with extraction. I then decided to use unground Irish moss as a starting point rather than the powder, with gratifying results.

Unground or crude Irish moss, as it occurs in bales on the market, is coarsely milled or chopped so that in the main it is in particles of about the size of commercial wheat bran particles. Such particles swell much more slowly in water than very fine particles, which is an advantage, enabling me to use more water. I find that by suspending 157 pounds chopped moss in 335 pounds water and 335 pounds 91% isopropyl alcohol the solvent action is increased and a more refined product results.

The yield by this treatment is about 76%.

Example III

Chopped Irish moss is placed in a basket-type centrifuge equipped with a fine wire filter screen and is made thoroughly wet with water. The centrifuge is started and, after attaining full speed, more water is poured into the basket. The material is allowed to "whiz" off the free water, is removed from the basket, spread on screen bottom trays to a depth of ¾" to 1" and dried.

The water in this treatment serves not only to wash away color, certain salts, etc., which, if present, impart an undesirable odor and taste to the moss; it also has a peculiar effect on those salts and other impurities which, prior to the above treatment, have been held within the particles of moss and not on the surface. This effect is noticeable after the chopped moss, treated as above, has become dry; for each flake or particle shows the presence of crystallized salt on its surface. It is my thought that this salt, originally held within the moss itself, has diffused through the film enclosing it, by dialysis. In other words, once the membrane, enclosing the salts, has become moist, dialysis proceeds, the salt diffuses through the membrane and, on drying, remains on the surface instead of in its original position within or enclosed by the membrane. The process may, of course, be repeated in order to remove more and more of the salts held within or enclosed by the membrane.

The process as practiced, however, has for its next step a mechanical treatment. The dried moss flakes are cleaned by agitating the material vigorously over a 100 mesh-wire screen. The flakes remain on the screen but sand, salt, etc., sift through and are discarded. The material that sifts through has practically no jell strength. Its elimination, therefore, increases the purity and jell strength of the remaining moss flakes. If sifted through an 80 mesh screen, a greater loss is obtained because more siftings result. These siftings have very little jell strength and their elimination would be advantageous.

The flaked or chopped moss is then preferably milled to a powder. Milling this material so that it is much finer than required to pass through a 100 mesh screen results in a product of inferior jell strength. At about 100 mesh fineness the maximum jell strength results consistent with salability of the product. A finer product, while of salable physical qualities, is inferior in jell strength; a coarser product, although of slightly higher jell strength, is not always salable or usable in that form.

The yield is about 70–75%. The decreased yield indicates that more impurities have been removed, thus increasing the purity and jell strength and decreasing odor, taste and other undesirable ingredients or properties.

The purified Irish moss prepared as described above may be used as a stabilizer in an ice-cream mix, or as an emulsifier, protective colloid, or jelling agent in various products, in a manner which will be obvious to those skilled in the art, similarly to the use of other stabilizing gums which have been previously used.

Various changes, modifications and variations coming within the spirit of my invention will doubtless suggest themselves to those skilled in the art. Hence, I do not wish to be restricted to the specific embodiments disclosed above or uses mentioned except to the extent indicated in the appended claims, which are to be interpreted as broadly as possible consistent with the state of the art.

I claim as my invention:

1. A method of treating commercial jell-forming seaweed for the purpose of improving the odor, flavor, and color thereof without substantially impairing the jell strength, comprising coarsely milling the commercial seaweed, subjecting the material to the action of a mixture of water and an alcohol miscible therein so as to effect a limited swelling of the seaweed particles and an extraction of the substances bearing undesirable flavors and odors naturally present in the seaweed, and then drying the residue.

2. A method as defined in claim 1, wherein the alcohol is ethyl alcohol.

3. A method as defined in claim 1, wherein the alcohol is isopropyl alcohol.

4. A method as defined in claim 1, wherein the quantity of water is approximately equal in weight to the quantity of alcohol, the alcohol is isopropyl alcohol, and the material is treated in comminuted condition.

5. A method as defined in claim 1, wherein said alcohol is a member of the group consisting of ethyl alcohol and isopropyl alcohol, and the material is treated in comminuted condition.

6. A method of treating jell-forming seaweed for the purpose of removing undesirable odor, flavor, color, and other impurities therefrom, and increasing the jell strength thereof, comprising coarsely milling the crude material, subjecting the milled particles to a treatment with an aqueous solvent whereby a substantial proportion of the inorganic salts contained in the seaweed particles is transferred to the outside thereof, said steps being performed without substantially heating the material, drying the particles, and then agitating them over a screen to remove adherent salts and insoluble materials.

7. A method of treating jell-forming seaweed for the purpose of removing undesirable odor, flavor, color, and other impurities therefrom and increasing the jell strength thereof, comprising coarsely milling the crude material, subjecting the milled particles to a treatment with an aqueous solvent whereby a substantial proportion of the inorganic salts contained in the seaweed particles is transferred to the outside thereof, said steps being performed without substantially heating the material, drying the particles, agitating the material over a screen between approximately 80 and 100 mesh to remove adherent salts and insoluble materials, and milling the material to a fineness of not substantially greater than 100 mesh.

8. A method of treating jell-forming seaweed for the purpose of removing undesirable odor, flavor, color, and other impurities therefrom and increasing the jell strength thereof, comprising coarsely milling the crude material, subjecting the milled particles to centrifuging with water whereby a substantial proportion of the inorganic salts contained therein is transferred to the outside of the particles, said operation being performed without heating the material, and treating the dried particles resulting from the preceding step so as to remove adherent salts and insoluble materials.

9. A method of treating jell-forming seaweed for the purpose of removing undesirable odor, flavor, color, and other impurities therefrom and increasing the jell strength thereof, comprising coarsely milling the crude material, subjecting the milled particles to centrifuging with water whereby a substantial proportion of the inorganic salts contained therein is transferred to the outside of the particles, said operation being performed without heating the material, treating the dried particles resulting from the preceding step so as to remove adherent salts and insoluble materials, and milling the material to a fineness not exceeding 100 mesh.

10. As a new composition of matter, a jell-forming seaweed which is substantially free from such odor, color, and flavor as would render the same unsuitable as a food ingredient, said composition having been prepared according to the method of claim 1.

11. As a new composition of matter, a jell-forming seaweed which is substantially free from such odor, color, and flavor as would render the same unsuitable as a food ingredient, said composition having been prepared according to the method of claim 6.

12. As a new composition of matter, a jell-forming seaweed which is substantially free from such odor, color, and flavor as would render the same unsuitable as a food ingredient, said composition having been prepared according to the method of claim 7.

13. As a new composition of matter, a jell-forming seaweed which is substantially free from such odor, color, and flavor as would render the same unsuitable as a food ingredient, said composition having been prepared according to the method of claim 8.

14. As a new composition of matter, a jell-forming seaweed which is substantially free from such odor, color, and flavor as would render the same unsuitable as a food ingredient, said composition having been prepared according to the method of claim 9.

WILLIAM SELTZER.